(12) United States Patent
Salem et al.

(10) Patent No.: US 10,771,103 B2
(45) Date of Patent: Sep. 8, 2020

(54) METHODS AND SYSTEMS FOR FULL DUPLEX COMMUNICATIONS

(71) Applicants: Mohamed Adel Salem, Ottawa (CA); Osama Aboul-Magd, Ottawa (CA)

(72) Inventors: Mohamed Adel Salem, Ottawa (CA); Osama Aboul-Magd, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 15/916,989

(22) Filed: Mar. 9, 2018

(65) Prior Publication Data

US 2019/0280728 A1 Sep. 12, 2019

(51) Int. Cl.
*H04J 3/00* (2006.01)
*H04B 1/56* (2006.01)
*H04L 5/14* (2006.01)

(52) U.S. Cl.
CPC ............. *H04B 1/56* (2013.01); *H04L 5/1453* (2013.01); *H04L 5/1469* (2013.01)

(58) Field of Classification Search
CPC ......... H04L 5/14; H04L 5/1423; H04W 72/04
See application file for complete search history.

(56) References Cited

U.S. PATENT DOCUMENTS

| | | | |
|---|---|---|---|
| 2009/0154379 A1* | 6/2009 | Hayashi | H04W 72/04 370/280 |
| 2010/0246559 A1* | 9/2010 | Ogawa | H04L 5/0007 370/345 |
| 2011/0063989 A1 | 3/2011 | Yang et al. | |
| 2013/0258885 A1* | 10/2013 | Yu | H04L 1/188 370/252 |
| 2016/0036542 A1 | 2/2016 | Gong et al. | |
| 2016/0157258 A1* | 6/2016 | Saiwai | H04L 5/0051 370/329 |
| 2016/0234003 A1* | 8/2016 | Wang | H04L 5/0032 |
| 2016/0249245 A1* | 8/2016 | Kim | H04B 17/345 |
| 2016/0323922 A1* | 11/2016 | Park | H04W 24/10 |
| 2017/0150492 A1* | 5/2017 | Ozaki | H04L 5/0044 |
| 2018/0097605 A1* | 4/2018 | Min | H04L 5/14 |

FOREIGN PATENT DOCUMENTS

| | | |
|---|---|---|
| CN | 101820636 A | 9/2010 |
| CN | 104105120 A | 10/2014 |
| CN | 107623541 A | 1/2018 |
| EP | 3474615 A1 | 4/2019 |
| WO | WO-2017186291 A1 * 11/2017 ........... H04L 5/0048 |
| WO | WO 2017186291 A1 * 11/2017 ........... H04L 5/0048 |

\* cited by examiner

*Primary Examiner* — Siren Wei

(57) ABSTRACT

An access point (AP) having full duplex (FD) capabilities transmits a trigger frame to cause at least a first station (STA) to initiate an uplink (UL) reference frame to the AP, the trigger frame further causing at least one second STA to obtain a signal strength measurement during transmission of the UL reference frame, and the AP receives from the at least one second STA, a reporting frame containing information about the signal strength measurement.

24 Claims, 11 Drawing Sheets

| Sum FD-Interference | FD Interferer ID |
|---|---|
| $I_5$ | 5 |
| $I_5+I_6$ | 6 |
| $I_5+I_6+I_2$ | 2 |
| $I_5+I_6+I_2+I_4$ | 4 |
| $I_5+I_6+I_2+I_4+I_3$ | 3 |

FIG. 8

| DL Rx STA | Tolerable FD-Interferers | |  |
|---|---|---|---|
| STA1 | STA5 | STA6 | ... |
| STA2 | STA3 | NULL | ... |
| ... | ... | ... | ... |
| STA6 | NULL | NULL | ... |

FIG. 9

METHODS AND SYSTEMS FOR FULL DUPLEX COMMUNICATIONS

FIELD

The present disclosure is related to methods and systems for full duplex communications. In particular, the present disclosure is related to methods and systems useful for management of interference in full duplex communications.

BACKGROUND

In full duplex (FD) communications, downlink (DL) transmissions (e.g., from an access point (AP) to a station (STA)) and uplink (UL) transmissions (e.g., from a STA to an AP) can take place simultaneously. In asymmetric FD communications, DL transmission occurs between one pair of nodes (e.g., the AP and a first STA), but UL transmission involves at least a different third node (e.g., the AP and a second STA).

In FD communications, the UL and DL transmissions use the same time-frequency resource, and the DL transmission and UL transmission may interfere with each other. Additionally, asymmetric FD may take place in an asynchronous manner, meaning that the UL and DL transmissions may begin at different times. However, because asymmetric FD involves different STAs in the DL and UL transmissions, the individual STAs may be unable to cancel out the interference.

It would be desirable to provide a mechanism to manage such interference, for example a mechanism that may be implemented by a FD-capable AP.

SUMMARY

In various examples described herein, methods and systems for carrying out FD communications are described. During (or in anticipation of) a DL transmission from an AP to a first STA, the AP may select a second STA for an UL transmission using the same time-frequency resource. Similarly, during (or in anticipation of) an UL transmission from a first STA to the AP, the AP may select a second STA for a DL transmission using the same time-frequency resource. The AP may obtain information about potential FD interference at individual STAs, and use such information in order to select one or more STAs for UL transmission such that there is little or no significant interference to the STA receiving the DL transmission. In the present disclosure, example methods are described in which the AP triggers measurement of potential interference by all associated STAs and each STA reports the measured potential interference back to the AP.

In a first aspect, the present disclosure describes a method that includes: transmitting, by an access point (AP) having full duplex (FD) capabilities, a trigger frame to cause at least a first station (STA) to initiate an uplink (UL) reference frame to the AP, the trigger frame further causing at least one second STA to obtain a signal strength measurement during transmission of the UL reference frame; and receiving, by the AP from the at least one second STA, a reporting frame containing information about the signal strength measurement.

In some examples of the first aspect, the method includes, based on the information contained in the reporting frame, selecting a UL transmitting STA for a FD UL transmission during a DL transmission. In some examples, the method includes storing, at the AP, potential interference information determined from the information contained in the reporting frame, the potential interference information indicating: for a given DL receiving STA, any acceptable UL transmitting STA for a FD UL transmission during a DL transmission to the given DL receiving STA, wherein selecting the UL transmitting STA is performed using the stored potential interference information.

In some examples of the first aspect, the method includes, based on the information contained in the reporting frame, selecting a DL receiving STA for a FD DL transmission during a UL transmission. In some examples, the method includes storing, at the AP, potential interference information determined from the information contained in the reporting frame, wherein the potential interference information indicates, for a given UL transmitting STA, any acceptable DL receiving STA for a simultaneous FD DL transmission during a UL transmission by the given UL transmitting STA. In some examples, selecting the DL receiving STA is performed using the stored potential interference information.

In some examples of the first aspect, the trigger frame causes a plurality of STAs to initiate transmission of respective UL reference frames to the AP, the respective UL reference frames being transmitted in sequence.

In some examples of the first aspect, the trigger frame indicates at least one of: an identifier of at least the first STA, a transmission parameter for transmitting the UL response transmission, or a reporting parameter for the reporting frame. In some examples, the transmission parameter includes at least one of: an indicator of a transmission power; an indicator of a time-frequency pattern of reference symbols; an indicator of a precoding to be used; an indicator of a transmission duration; or an indicator of a transmission resource to be used. In some examples, the reporting parameter includes at least one of: an indicator of a tolerable interference threshold; an indicator of a maximum number of tolerable interferers; or an indicator of a time for transmitting the reporting frame.

In some examples of the first aspect the AP has capabilities for asynchronous FD communications.

In some examples of the first aspect the AP has capabilities for synchronous FD communications.

In some examples of the first aspect the method includes, when a UL reference frame from the first STA is not received, retransmitting, by the AP, the trigger frame to the first STA. In some examples, when a UL reference frame from the first STA is not received after a preset time period or after a preset number of retransmissions, the first STA is excluded from FD transmissions for at least a defined time period.

In a second aspect, a method is described that includes: in response to receipt of a trigger frame from an access point (AP), obtaining, by a second station (STA), a signal strength measurement during transmission of a first uplink (UL) reference frame by a first STA; and transmitting, to the AP, a reporting frame containing information about the signal strength measurement.

In some examples of the second aspect, the information contained in the reporting frame includes at least one of a measured signal power or an identifier of a source of measured signal strength. In examples the information contained in the reporting frame includes only the measured signal power or the identifier for any signal strength measurements within a defined tolerable interference threshold.

In some examples of the second aspect, the method includes, in response to receipt of the trigger frame from the AP, transmitting, by the second STA, a second UL reference frame to the AP. In some examples, the second UL reference frame is transmitted by the second STA in sequence with the first UL reference frame by the first STA.

In a third aspect is an access point (AP) is described having full duplex (FD) capabilities and a communications interface for wireless communications with at least a first and a second station (STA). The AP includes a processor configured to execute instructions to cause the AP to: transmit a trigger frame, the trigger frame causing at least the first STA to initiate transmission of an uplink (UL) reference frame to the AP, the trigger frame further causing at least the second STA to obtain a signal strength measurement during transmission of the UL reference frame, the signal strength measurement being a measurement indicative of any potential interference caused by UL transmission from the first STA and potentially affecting reception of downlink (DL) transmission to the second STA; and receive, from at least the second STA, a reporting frame containing information about the signal strength measurement.

In some examples of the third aspect the processor is further configured to execute instructions to cause the AP to, based on the information contained in the reporting frame, select a UL transmitting STA for a FD UL transmission during DL transmission.

In some examples of the third aspect, the processor is further configured to execute instructions to cause the AP to, based on the information contained in the reporting frame, select a DL receiving STA for a FD DL transmission during a UL transmission.

In some examples of the third aspect the trigger frame indicates at least one of: an identifier of at least the first STA, a transmission parameter for transmitting the UL reference frame, or a reporting parameter for the reporting frame.

In a fourth aspect a first station (STA) is described having a communications interface for wireless communications with an access point (AP). The first STA includes a processor configured to execute instructions to cause the first STA to: in response to receipt of a trigger frame from the AP, obtain a signal strength measurement during transmission of a first uplink (UL) reference frame by a second STA, the signal strength measurement being a measurement indicative of any potential interference caused by UL transmission from the second STA and potentially affecting reception of simultaneous downlink (DL) transmission to the first STA; and transmit, to the AP, a reporting frame containing information about the signal strength measurement.

In some examples of the fourth aspect, the processor is further configured to execute instructions to cause the first STA to, in response to receipt of the trigger frame from the AP, transmit a second UL reference frame to the AP.

BRIEF DESCRIPTION OF THE DRAWINGS

Reference will now be made, by way of example, to the accompanying drawings which show example embodiments of the present application, and in which:

FIG. 8 shows an example table that may be used to report potential interference measurements to an AP;

FIG. 9 shows an example table that may be used to store potential interference information at an AP;

Similar reference numerals may have been used in different figures to denote similar components.

DESCRIPTION OF EXAMPLE EMBODIMENTS

Examples described herein provide methods and systems for managing interference in full duplex (FD) communications. The access point (AP) may transmit a trigger frame, for example a FD-interference measurement trigger frame, that causes some or all of the associated stations (STAs) to perform operations to measure potential interference. For example, a STA may transmit a response frame or reference frame, for example a FD-interference reference frame, that may be used by other STAs to measure potential interference from the transmitting STA. After the potential interference has been measured, each STA may report the measured potential interference to the AP in a reporting frame, for example a FD-interference measurement reporting frame. The AP may use the potential interference information obtained from the STAs to select one or more appropriate STAs for asymmetric FD communications.

Figure 1:
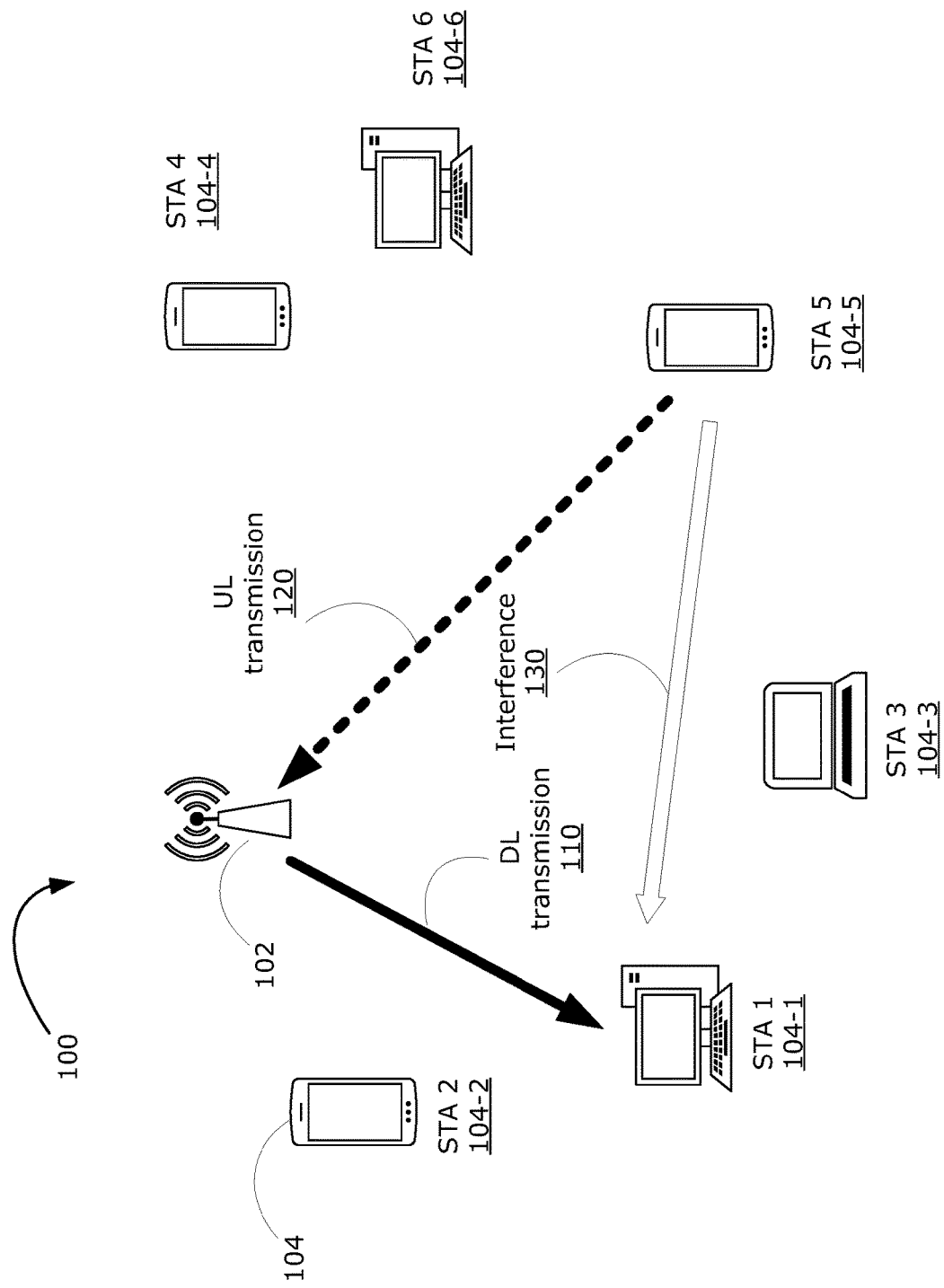
FIG. 1 is a schematic diagram illustrating an example of interference between DL and UL transmissions during FD communications.

FIG. 1 is a schematic diagram of an example system 100 in which methods described herein may be implemented. The system 100 illustrates a Wi-Fi infrastructure, including an AP 102, which has FD capabilities. The AP 102 may be also referred to as a principal control point (PCP) or a base station. The AP 102 may be implemented as a router, for example. Generally, the AP 102 may refer to any component (or collection of components) configured to provide wireless access in a network, such as an evolved NodeB (eNB), a macro-cell, a femtocell, distribution node, a Wi-Fi AP, or other wirelessly enabled devices. The AP 102 may, for example, provide wireless access in accordance with one or more wireless communication protocols, e.g., Long Term Evolution (LTE), LTE advanced (LTE-A), High Speed Frame Access (HSPA), Wi-Fi 802.11a/b/g/n/ac/ad, and other 802.11 protocols. Multiple STAs 104 are associated with the AP 102. Each STA 104 may operate independently of each other, with different capabilities. For example, each STA 104 may or may not have FD capabilities. In the example shown, there are 6 STAs, labeled STA1 to STA6 (individually, 104-1 to 104-6; generally referred to as STAs 104). The STAs 104 may also be referred to as terminals, user devices, user equipment (UE) or clients, for example. Each STA 104 may be any component (or collection of components) capable of wireless communications, such as any suitable electronic device (ED) capable of wireless communication, including mobile or stationary devices such as smartphones, laptops, mobile phones, an Internet of Things (IoT) device, tablet devices or any other wirelessly enabled device, for example, and the STAs 104 need not be the same as each other.

The system 100 may support communication between the AP 102 and each STA 104, as well as communication directly between STAs 104 (also referred to as device-to-device communication). A STA 104 may also serve as a relay for AP-to-STA or STA-to-STA communications. The AP 102 may also carry out multi-user (MU) transmissions (e.g., transmissions from the AP 102 to multiple STAs 104 simultaneously), for example by using directional antennas and/or by using frequency separation.

Figure 2:
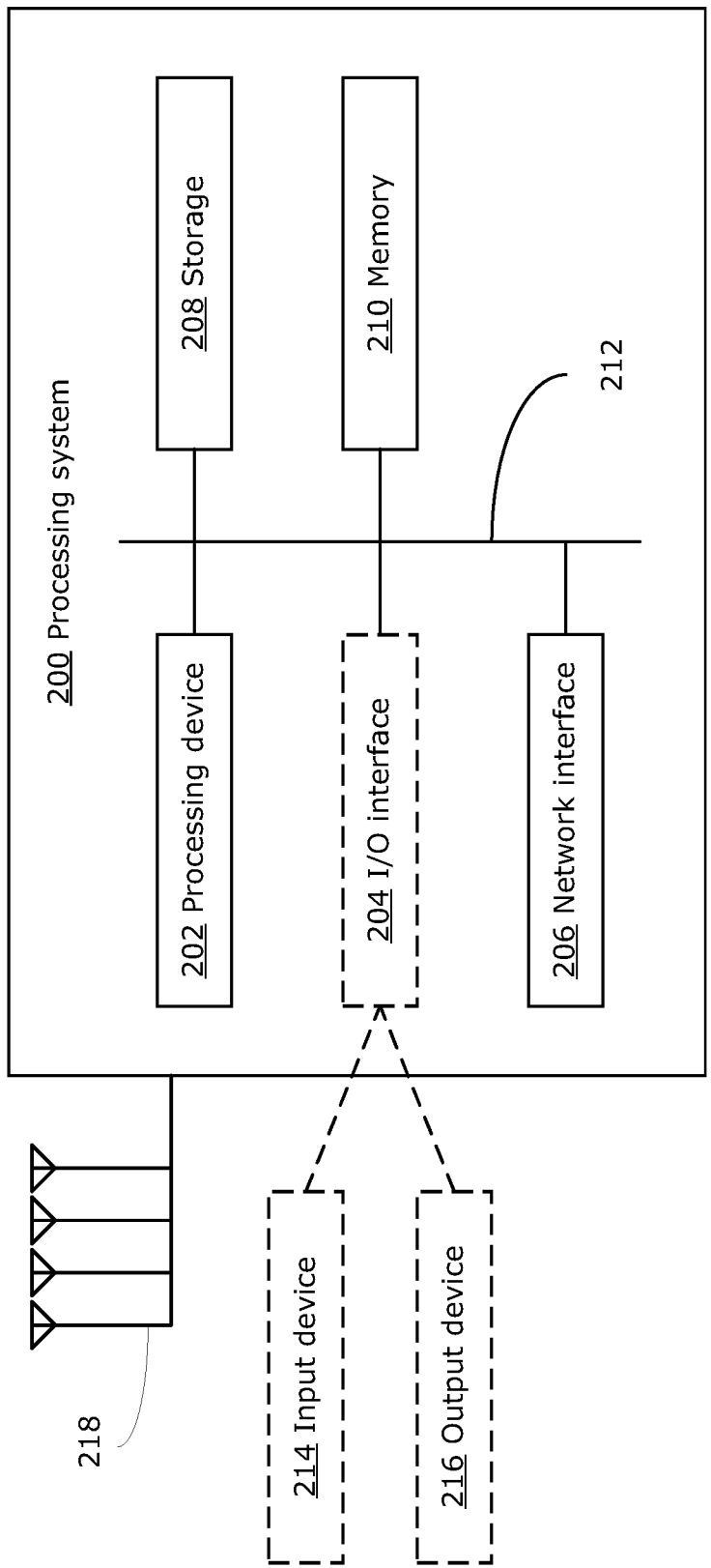
FIG. 2 is a block diagram illustrating an example device suitable for performing FD communications.

FIG. 2 is a block diagram of an example simplified processing system 200, which may be used to implement embodiments disclosed herein. The example processing system 200 described below, or variations thereof, may be used to implement the AP 102 or any one of the STAs 104. Other processing systems may be suitable for implementing embodiments described in the present disclosure, and may include components different from those discussed below. Although FIG. 2 shows a single instance of each component, there may be multiple instances of each component in the processing system 200.

The processing system 200 may include one or more processing devices 202, such as a processor, a microprocessor, an application-specific integrated circuit (ASIC), a field-programmable gate array (FPGA), a dedicated logic circuitry, or combinations thereof. The processing system 200 may optionally include one or more input/output (I/O) interfaces 204, to enable interfacing with one or more optional input devices 214 and/or output devices 216. The processing system 200 may include one or more network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The network interface(s) 206 may provide wireless communication via one or more antennas. In this example, multiple antennas together form an antenna array 218, which may perform both transmitting and receiving functions. The antenna array 218 may enable directional communications using beamforming and beamtracking. In other examples there may be separate antennas or separate antenna arrays for transmitting and receiving.

The processing system 200 may also include one or more storage units 208, which may include a mass storage unit such as a solid state drive, a hard disk drive, a magnetic disk drive and/or an optical disk drive. The processing system 200 may include one or more memories 210, which may include a volatile or non-volatile memory (e.g., a flash memory, a random access memory (RAM), and/or a read-only memory (ROM)). The non-transitory memory(ies) 210 may store instructions for execution by the processing device(s) 202, such as to carry out example methods described in the present disclosure. The memory(ies) 210 may include other software instructions, such as for implementing an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 212 providing communication among components of the processing system 200, including the processing device(s) 202, optional I/O interface(s) 204, network interface(s) 206, storage unit(s) 208 and/or memory(ies) 210. The bus 212 may be any suitable bus architecture including, for example, a memory bus, a peripheral bus or a video bus.

In FIG. 2, the optional input device(s) 214 (e.g., a keyboard, a mouse, a microphone, a touchscreen, and/or a keypad) and optional output device(s) 216 (e.g., a display, a speaker and/or a printer) are shown as external to the processing system 200. In other examples, one or more of the input device(s) 214 and/or the output device(s) 216 may an internal component of the processing system 200.

Reference is again made to FIG. 1. FIG. 1 shows an example set of asymmetric FD communications, and the resulting FD-interference. The asymmetric FD communications may be asynchronous FD communications or synchronous FD communications. For simplicity, asynchronous FD communications will be described below, however it should be understood that this is not intended to be limiting.

In an example of asynchronous FD communications, the AP 102 initiates a downlink (DL) transmission 110 to STA1 104-1. The DL transmission 110 may include a frame (e.g., data frame), with a frame header (e.g., a physical layer (PHY) header or media access control (MAC) header) providing information about a FD transmission opportunity (TXOP). The other STAs 104 associated with the AP 102 may also receive this TXOP information (e.g., by overhearing the DL transmission 110). A STA 104 may be able to take advantage of the TXOP to send an uplink (UL) transmission to the AP 102 at the same time as the DL transmission 110.

In the present disclosure, FD communications are communications in which an UL transmission and a DL transmission at a node share the same time-frequency resource for at least a portion of the transmission. That is, the UL transmission received at a node and the DL transmission sent from the same node both take place using at least some of the same sub-carriers at the same time, for at least a portion of the transmissions. This should not be confused with FD emulation techniques such as time division duplex (TDD) (which separate UL and DL signals in time) or frequency division duplex (FDD) (which separate UL and DL signals in frequency).

In some examples, the AP 102 may select one or more particular STAs 104 for the UL transmission. Multiple STAs 104 may be able to send UL transmissions to the AP 102 simultaneously using MU UL transmission mode, for example. In the example shown, the AP 102 selects STA5 104-5 for an UL transmission 120 at the same time as the DL transmission 110.

In another example of asynchronous FD communications, the UL transmission 120 may be initiated first, and the AP 102 may then select one or more particular STAs 104 for a simultaneous DL transmission 110. DL transmissions 110 may be sent to multiple STAs 104 simultaneously using MU DL transmission mode, for example. For example, the UL transmission 120 from STA5 104-5 may be initiated and then the AP 102 may select STA1 104-1 for a simultaneous DL transmission 110.

Regardless of whether the DL transmission 110 or UL transmission 120 is initiated first, the DL transmission 110 from the AP 102 to STA1 104-1 may potentially create interference to the AP's 102 reception of the UL transmission 120 from STA5 104-5. The AP 102 may take action to manage and/or mitigate this self-interference. In the present disclosure, the FD-capable AP 102 has functions (which may be implemented in hardware and/or software) that allow the AP 102 to substantially limit any self-interference from the ongoing DL transmission 110 to the concurrent UL transmission 120. In the present disclosure, mitigation of any self-interference caused by the DL transmission 110 from the AP 102 to STA1 104-1 will not be discussed in detail. The UL transmission 120 may also cause interference 130 at the receiving STA 104, in this example STA1 104-1, which the receiving STA 104 may not have sufficient ability to mitigate. In some examples, the AP 102 may select the STAs 104 for the UL transmission 120 and/or the DL transmission 110 in order to mitigate the interference 130 that would be experienced by the receiving STA 104.

For example, where the DL transmission 110 is initiated first, selection of the STA(s) 104 for simultaneous UL transmission 120 may be based on information about potential (or expected) interference that would be caused by the UL transmission 120. Similarly, where the UL transmission 120 is initiated first, selection of the STA(s) 104 for simultaneous DL transmission 110 may be based on information about potential (or expected) interference that would be experienced by the DL transmission 110. Further, the AP 102 may indicate acceptable UL transmit power levels to mitigate the interference with an ongoing DL transmission 110. The AP 102 may also control the DL transmit power to mitigate interference from an ongoing UL transmission 120.

As mentioned previously, the present disclosure is not limited to asynchronous FD communications. For example, the present disclosure may also be used (with appropriate modifications where necessary) for FD communications in other radio access technologies (RATs), such as communications using licensed and/or unlicensed spectrum, and/or in cellular or other wireless networks. The present disclosure may be used to address the challenges of FD interference for asynchronous or synchronous FD communications. For example, in the case of synchronous FD communications (e.g., in cellular networks), where DL and UL transmissions 110, 120 are both scheduled to be initiated at the same time, the AP 102 may use information about potential (or expected) interference that would be caused by the UL transmission 120 to select one or more appropriate STAs 104 for the DL transmission(s) 110, and schedule both DL and UL transmissions 110, 120 accordingly.

Figure 3:
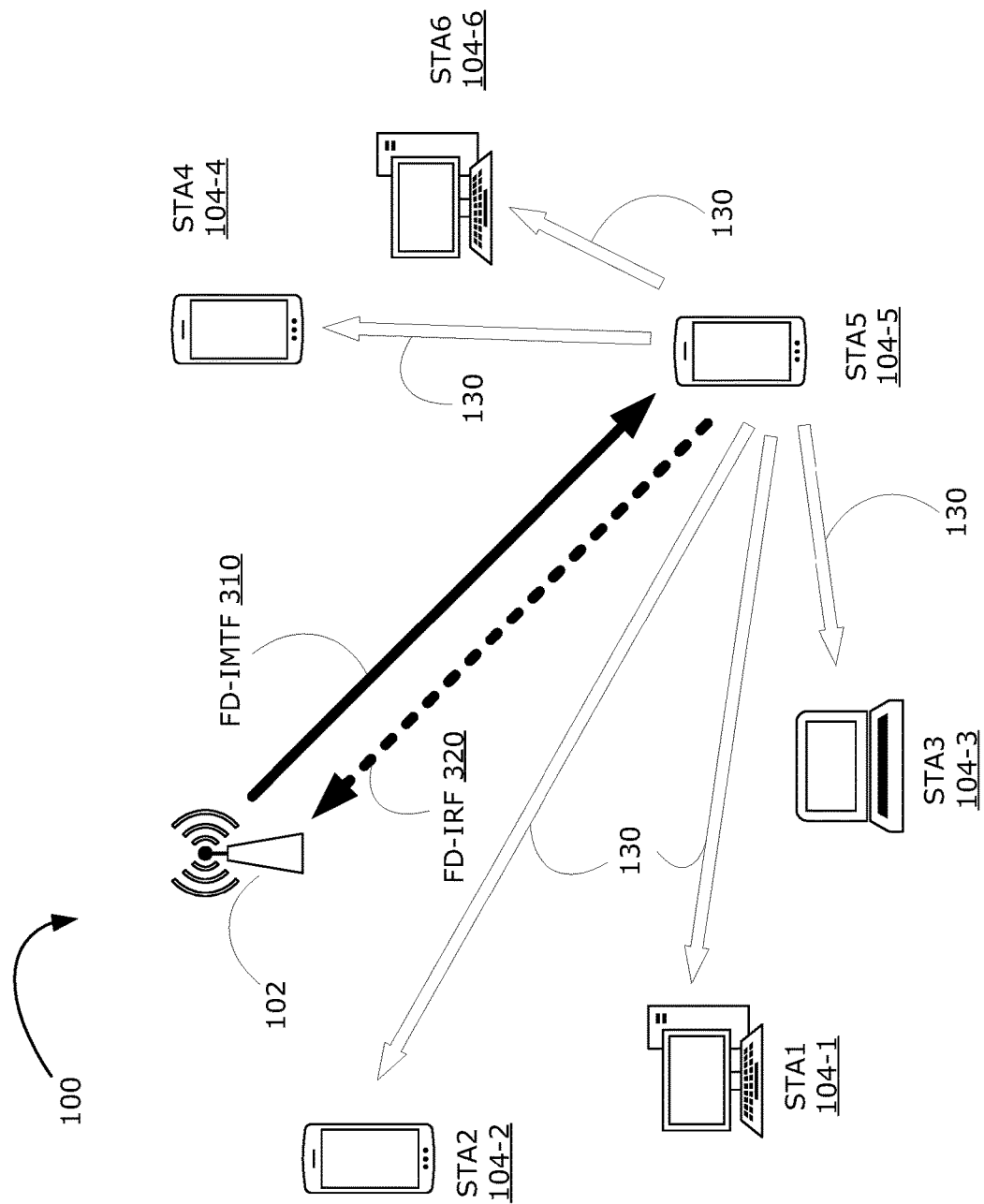
FIG. 3 is a schematic diagram illustrating example operations for obtaining measurements of potential FD interference.

In order to more effectively manage interference, it would be useful to have a way for the AP 102 to obtain information about the potential FD-interference that each STA 104 would cause for another STA 104. FIG. 3 illustrates an example set of operations for obtaining such potential interference information. In the present disclosure, potential interference refers to the interference that is possible or expected to be caused by a transmission. The potential interference may be measured or estimated by measuring the power of an UL transmission that is not actually interfering with a DL transmission, as described in various examples below.

As shown in FIG. 3, the AP 102 transmits a trigger frame, such as a FD-interference measurement trigger frame (FD-IMTF) 310, to an associated STA 104, regardless of whether the STA 104 is FD-capable or not. As noted previously, a STA 104 may participate in FD communications with the FD-capable AP 102 regardless of whether the STA 104 is FD-capable or not. FIG. 3 illustrates transmission of the FD-IMTF 310 to STA5 104-5. However, it should be understood that the FD-IMTF 310 may be multicast to multiple STAs 104, for example may be multicast to all associated STAs 104. When a STA 104 receives the FD-IMTF 310, the STA 104 may determine if the FD-IMTF 310 is intended for itself (e.g., based on an identification of the intended STA included in the FD-IMTF 310). If the STA 104 is the intended STA, then receipt of the FD-IMTF 310 causes the STA 104 to respond with transmission of a response frame, for example a reference frame such as a FD-interference reference frame (FD-IRF) 320, back to the AP 102. For example, FIG. 3 shows transmission of the FD-IRF 320 by STA5 104-5 to the AP 102.

When a given STA 104 transmits the FD-IRF 320 to the AP 102, this transmission is sent by the STA 104 in a manner similar to a regular UL transmission (e.g., in accordance with transmission parameters indicated in the FD-IMTF 310). The FD-IRF 320 may have any suitable format. For example, the FD-IRF 320 may be a relatively simple PHY signal carrying reference symbols or pilot signals, which may be spread across frequency and time resources following a predefined or known pattern. In some examples, the FD-IRF 320 may also include (e.g., in the PHY header) preamble information enabling backward compatibility and coexistence with legacy devices and/or other RATs (e.g., other devices operating according to other 802.11 standards).

In some examples, the AP 102 may take no action upon receiving the FD-IRF 320 (e.g., the FD-IRF 320 may be ignored or dismissed upon receipt by the AP 102). In some examples, the AP 102 may measure the signal quality (e.g., as indicated by the received signal power or signal-to-interference-plus-noise ratio (SINR)) of the received FD-IRF 320 from a STA 104 to assess the quality of potential UL transmissions from that STA 104. Based on the measured signal quality, the AP 102 may provide the STA 104 with feedback or instructions for adjusting the signal quality, for example using closed-loop link adaptation (e.g., by adjusting the modulation and coding scheme (MCS) level). In some other examples, if the AP 102 does not receive an expected FD-IRF 320, this may indicate that an intended STA 104 was not able to decode the FD-IMTF 310, or the intended STA 104 does not support or has been set to be unresponsive to the FD-IMTF 310. In the present disclosure, an intended STA 104 that fails to send a FD-IRF 320 in response to the FD-IMTF 310 is referred to as an unresponsive STA. An unresponsive STA does not participate in the measurement period. An "unresponsive" STA is not to be confused with a "non-responding" STA. In the present disclosure, a non-responding STA is a STA that is not the intended recipient of the FD-IMTF 310 that is not expected to respond to the FD-IMTF 310, however the non-responding STA still participates in the measurement period (e.g., by measuring potential interference, as discussed further below).

If the AP 102 does not receive an expected FD-IRF 320, the AP 102 may retransmit the FD-IMTF 310 to the unresponsive intended STA 104 that failed to send the expected FD-IRF 320. Retransmission of the FD-IMTF 310 to the unresponsive STA 104 may occur before or after transmission of other FD-IMTF(s) 310 to other intended STA(s). Retransmission of the FD-IMTF 310 to the unresponsive STA 104 may be performed for a preset number of times, and if the unresponsive STA 104 still fails to respond with the FD-IRF 320, the AP 102 may exclude the unresponsive STA 104 from FD TXOPs for one or more subsequent measurement periods. The AP 102 may include the unresponsive STA 104 again in other future measurement periods. In examples where the FD-IMTF 310 is intended for two or more STAs 104 (e.g., as described further below with reference to FIG. 5), the AP 102 may exclude any unresponsive STA 104 from the FD TXOP for one or more subsequence measurement periods, without attempting retransmission of the FD-IMTF 310. This may be to avoid ambiguity at other responding STAs 104. In some examples, if an unresponsive STA 104 remains unresponsive to the FD-IMTF 310 for a preset interval of time and/or for a preset number of FD-IMTFs 310, the AP 102 may determine that the unresponsive STA 104 is a legacy device that does not have the capability to recognize and respond to the FD-IMTF 310, or that the unresponsive STA 104 has been set to not respond to the FD-IMTF 310. The AP 102 may exclude the unresponsive STA 104 from all future FD-IMTF 310 transmissions and from all future FD TXOPs. In some examples, the AP 102 may have already identified unresponsive STAs 104 (e.g., a STA may have identified itself as a legacy device or identified itself as being set to be unresponsive), for example through exchange of management frames, and may exclude such identified unresponsive STAs 104 ahead of any FD-IMTF 310 attempts.

During the transmission of the FD-IRF 320 by a responding STA 104, the other STAs 104 (also referred to as non-responding STAs 104) measure the potential interference 130 that would be experienced in regular DL reception by measuring the signal strength of the FD-IRF 320. For example, FIG. 3 shows all STAs 104 aside from STA5 104-5 measuring the potential interference 130 caused by transmission of the FD-IRF 320 by STA5 104-5. The measured potential interference 130 is recorded by each STA along with an indication of the source of potential interference (e.g., logical index of source STA). A STA 104 may obtain the potential interference measurement by measuring the power of any signal over its receive channels during the transmission of the FD-IRF 320. The potential interference measurement is more generally a measurement of signal strength by a STA 104, during transmission of an UL reference frame by another STA 104. Although referred to as a potential interference measurement, the STA 104 need not recognize the measurement as being indicating of potential interference. From the viewpoint of the STA 104, a potential interference measurement may be simply a measurement of signal strength, which is subsequently reported to the AP 102.

In examples where the AP 102 transmits multiple FD-IMTFs 310 in a sequence, the last FD-IMTF 310 in the sequence may include an indication (e.g., an end-of-sequence flag) to indicate that it is the last FD-IMTF 310 in the sequence. This may enable the STAs 104 to determine the appropriate time to provide the measured potential interference information to the AP 102 (e.g., as described further below). In the case where the AP 102 retransmits a FD-IMTF 310 to a specific unresponsive STA 104 after transmission of a sequence of FD-IMTFs 310 to other intended STAs, the AP 104 may indicate (e.g., using an end-of sequence flag) that the last retransmission of the FD-IMTF 310 to the unresponsive STA 104 is the last FD-IMTF 310 in the sequence.

Figure 4:
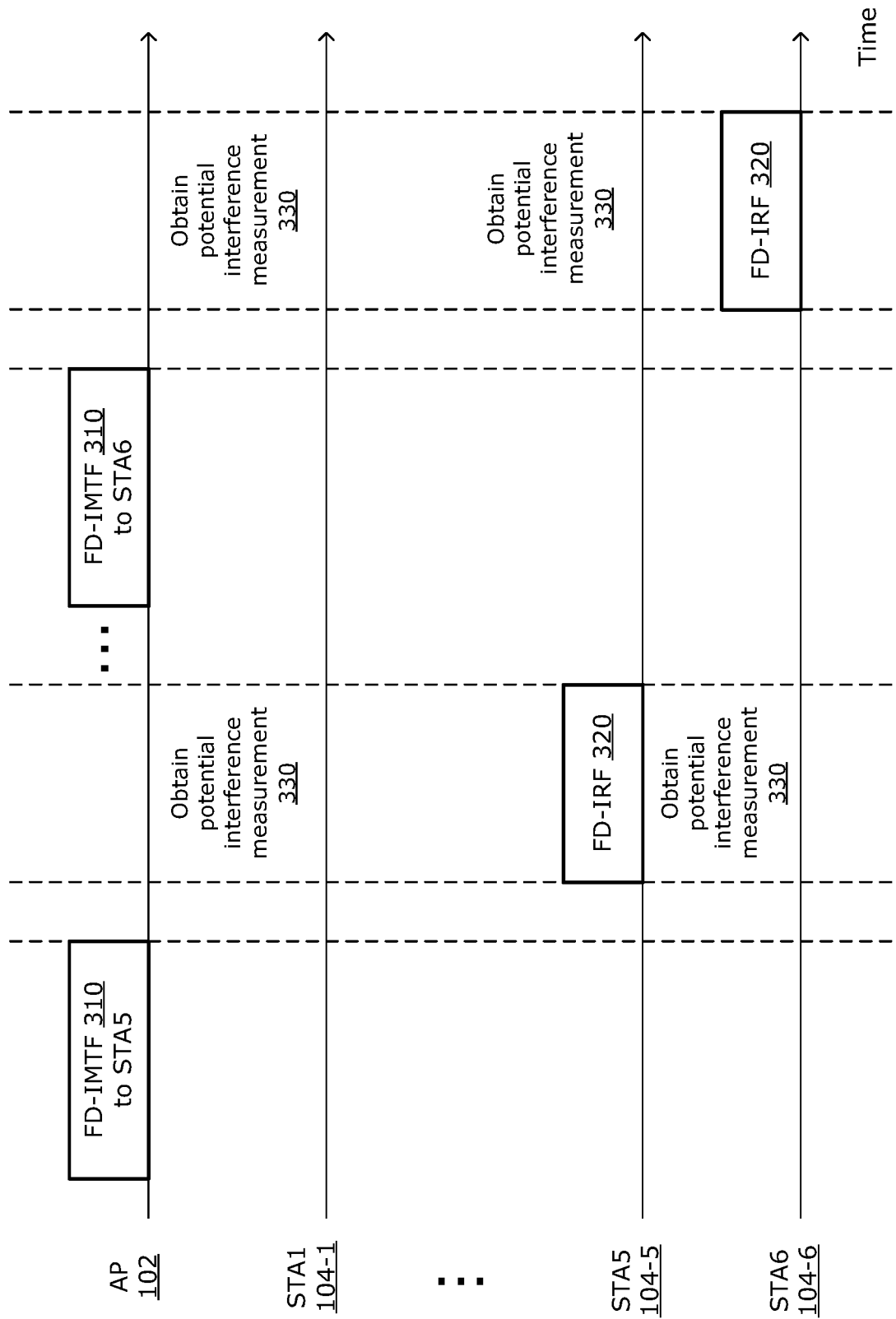
FIG. 4 is a timing diagram illustrating an example implementation of the operations of FIG. 3.

FIG. 4 is a timing diagram illustrating an example implementation of the operations shown in FIG. 3. In the example of FIG. 4, the AP 102 transmits a multicast FD-IMTF 310 to all associated STAs 104. Each FD-IMTF 310 is intended to cause a specific STA 104 to respond with the FD-IRF 320. For example, the FD-IMTF 310 may include a parameter indicating the intended responding STA 104, such as a logical index or STA identifier (ID) of the intended STA 104. Each STA 104 that is associated with the AP 102 may be assigned a logical index. The logical index for each STA 104 may be assigned by the AP 102 dynamically (e.g., using the FD-IMTF 310), or semi-statically (e.g., using a management frame). All STAs 104 may receive the FD-IMTF 310. Only the intended STA 104 responds with the FD-IRF 320, and all other STAs 104 measure the potential interference 130 during the transmission of the FD-IRF 320.

In the example shown in FIG. 4, the AP 102 transmits a FD-IMTF 310 intended for STA5 104-5. STA5 104-5 responds by transmitting the FD-IRF 320 substantially immediately (e.g., after a single short interframe space (SIFS)) after the FD-IMTF 310 is received. All other STAs 104 obtain potential interference measurement 330 by measuring any potential interference caused by the UL transmission by STA5 104-5. The other STAs 104 may use information contained in the FD-IMTF 310, such as an identifier (e.g., logical index or STA ID) of the intended STA 104, to determine the source of the measured potential interference (in this case, STA5 104-5) and may record the measured potential interference together with the identifier of the source of potential interference. The AP 102 may transmit one or more FD-IMTFs 310 for one or more other intended STAs 104. For example, the AP 102 may transmit FD-IMTFs 310 to all other associated STAs 104, so that all STAs 104 may obtain measurements of potential interference from all other STAs 104 (with the exception of any unresponsive or otherwise excluded STAs 104). The STAs 104 then report the measured potential interference back to the AP 102 using a reporting frame, such as a FD-interference measurement reporting frame (FD-IMRF), described further below.

The FD-IMTF 310 may include information to cause the intended STA 104 to transmit the FD-IRF 320 according to certain parameters. In particular, the FD-IMTF 310 may cause the STA 104 to transmit the FD-IRF 320 in a way that mimics regular UL transmissions, in order for the measured potential interference to be a good representation of interference that would be experienced during an actual UL transmission. For example, the FD-IMTF 310 may include an indication of the power level, precoding and duration that should be used for transmission of the FD-IRF 320. These parameters may be indicated separately in the FD-IMTF 310. In some examples, there may be one or more sets of predefined transmission parameters, and the FD-IMTF 310 may include just an indicator (e.g., index) of the particular predefined set to use, instead of indicating the transmission parameters individually. In some examples, the transmission parameters to be used may have already been indicated (e.g., by a previous FD-IMTF 310 or management frame) and may not need to be indicated again. The FD-IMTF 310 may also include information to cause other STAs 104 to measure the potential interference and report back the measured potential interference. For example, the FD-IMTF 310 may indicate to other STAs 104 that a FD-IRF 320 will follow, and the other STAs 104 may accordingly listen for and measure the interference caused by the FD-IRF 320. The FD-IMTF 310 may include parameters to be used when reporting back the measured potential interference, which will be described further below.

Figure 5:
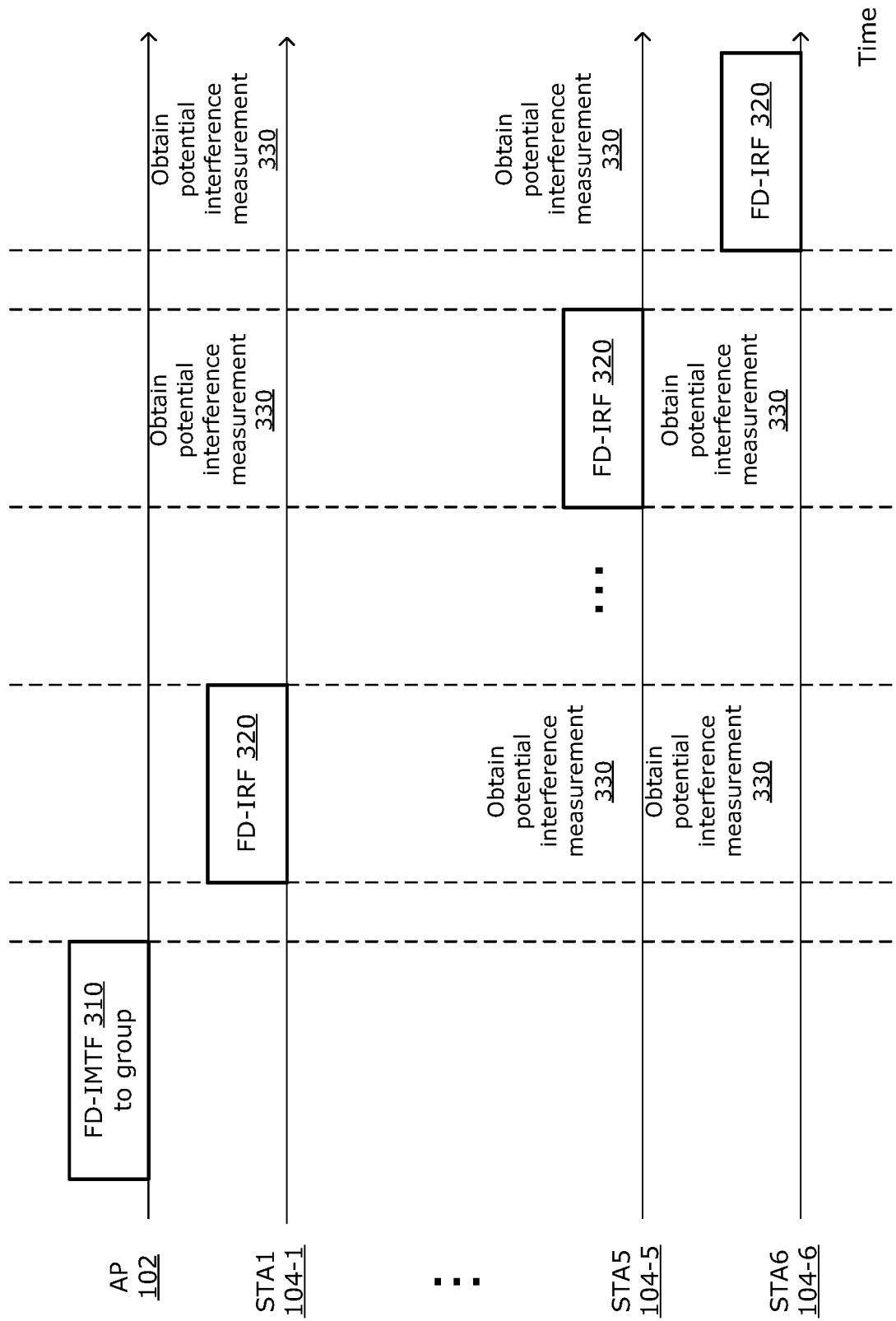
FIG. 5 is a timing diagram illustrating another example implementation of the operations of FIG. 3.

FIG. 5 is a timing diagram illustrating another example implementation of the operations shown in FIG. 3. In this example, rather than the FD-IMTF 310 causing a response from a single STA 104, the FD-IMTF 310 is intended for multiple STAs 104 (e.g., all associated STAs 104, or a group of two or more intended STAs 104) and triggers the transmission of FD-IRF 320 by multiple STAs 104 in sequence. The FD-IMTF 310 may be transmitted as a single multicast to a group of STAs 104 or all STAs 104 associated with the AP 102. The FD-IMTF 310 may include parameters to cause the STAs 104 to respond sequentially with individual FD-IRFs 320. For example, the FD-IMTF 310 may indicate the sequence in which the STAs 104 should respond (e.g., indicate the sequence of logical indexes of the STAs 104). The FD-IMTF 310 may explicitly indicate a time for the STAs 104 to report the measured potential interference back to the AP 102. In some examples, such explicit indication of a reporting time are not used, and instead the STAs 104 may determine the appropriate time to report the measured potential interference based on the number of STAs 104 addressed by the FD-IMTF 310 (e.g., the reporting time may be the time slot immediately following the expected group response period, where the group response period may be calculated as the number of logical indexes indicated in the FD-IMTF 310 multiplied by the time period for transmission of one FD-IRF 310). The FD-IMTF 310 may also indicate the end of the trigger sequence (e.g., if more than one group of STAs 104 are triggered separately). Generally, the STAs 104 may not report the measured potential interference to the AP 102 before the end of the response period (whether the response period is calculated by each STA 104 or explicitly indicated by the AP 102). The STAs 104 may report the potential interference to the AP 102 after the end of the response period. It should be understood that the calculated or explicitly indicated time for reporting is considered to be a time when the STAs 104 may begin to report back to the AP 102, but the STAs 104 in some cases may not report back at exactly that time (e.g., due to clear channel assessment (CCA) failure).

After a STA 104 receives the FD-IMTF 310, the STA 104 uses the information contained in the FD-IMTF 310 to respond by transmitting the FD-IRF 320 back to the AP 102 at a designated time slot, and to measure potential interference from other STAs 104 when the other STAs 104 respond at their respective time slots. For example, the first STA 104 indicated in the sequence determines that it should start transmitting the FD-IRF 320 after SIFS from the end of the triggering FD-IMTF 310, and the n-th STA 104 indicated in the sequence determines that it should start transmitting the FD-IRF 310 after a time duration of (n SIFSs plus (n−1) IRF durations) (in the case where there is a separation of SIFS between transmissions of FD-IRFs 320) from the end of the triggering FD-IMTF 310. A STA 104 may also use the indicated sequence to determine the source of measured potential interference at a given time slot. In the example shown in FIG. 5, in response to the FD-IMTF 310, the STAs 104 each transmit a respective FD-IRF 320 in sequence. The transmission of FD-IRFs 320 may be separated by a time gap (e.g., separated by a SIFS). During the transmission of FD-IRFs 320, the non-responding STAs obtain potential interference measurement 330 and record the potential interference measurement, as described above.

Figure 6:
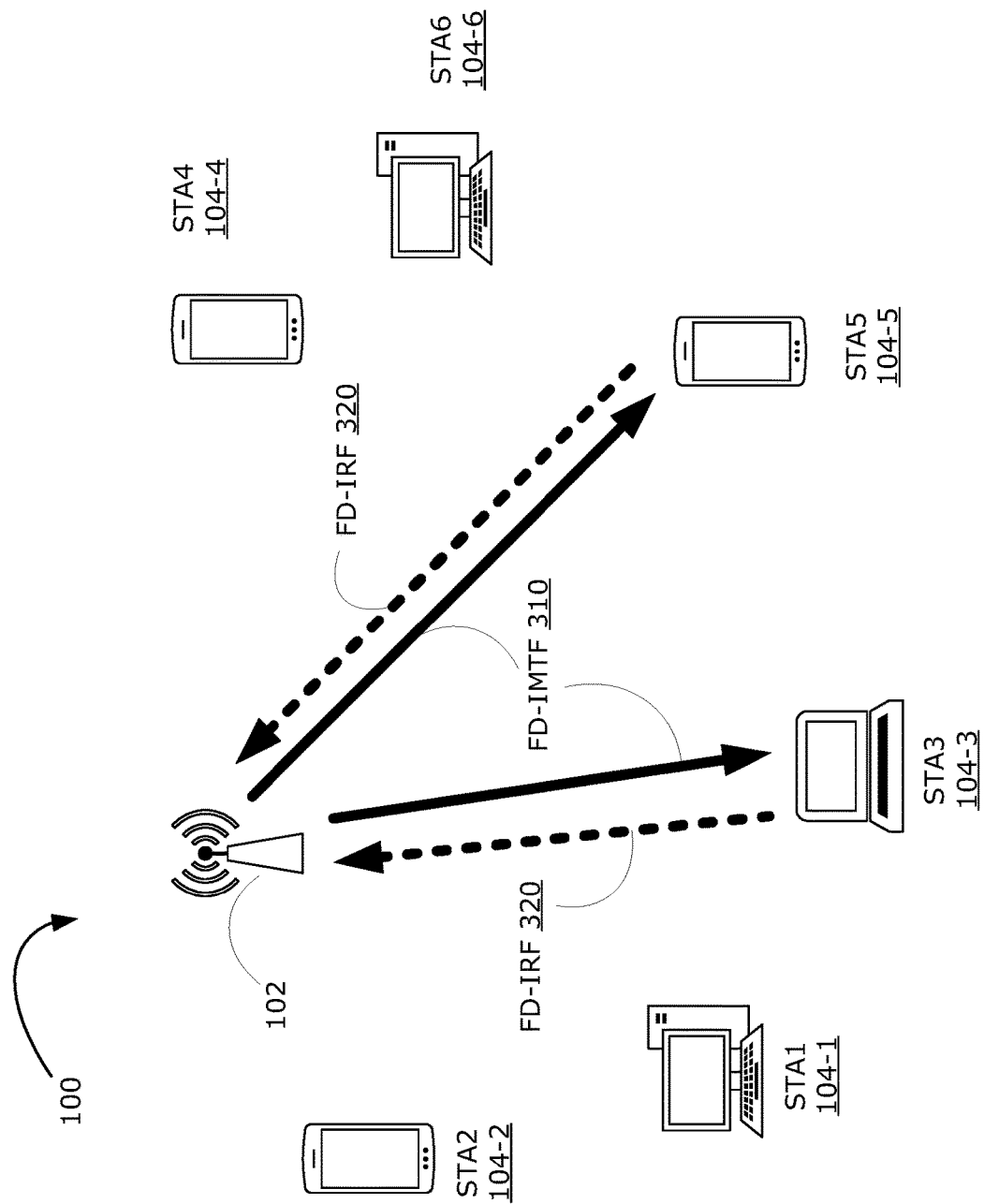
FIG. 6 is a schematic diagram illustrating another set of example operations for obtaining measurements of potential FD interference.

FIG. 6 illustrates another example set of operations for obtaining potential interference information. The example operations shown in FIG. 6 may be suitable in cases where MU UL multiplexing (e.g., in frequency and/or spatial domain) is used. Use of MU UL multiplexing enables two or more STAs 104 to, in parallel, transmit a respective FD-IRF 320 to the AP 102, in response to a FD-IMTF 310. For example, the AP 102 may transmit a multicast FD-IMTF 310 that is intended for a group of STAs 104, and the intended group of STAs 104 may respond (e.g., immediately following a SIFS) at the same time using different resources.

The FD-IMTF 310 may include information similar to that described above with respect to FIGS. 3-5, such as information indicating the intended STAs 104, information indicating the transmission parameters to be used for the FD-IRF 320, and/or information indicating how interference should be measured and reported by the non-responding STAs 104. In the case of MU UL multiplexing, the FD-IMTF 310 may include identifiers of each STA 104 in the group of intended responding STAs 104, or may include a group identifier that identifies the intended responding STAs 104 as a group. The FD-IMTF 310 may also include information indicating the resource (e.g., frequency resource or spatial resource) to be used by each responding STA 104, so that the responding STAs 104 do not collide with each other in the MU UL transmission of the FD-IRFs 320. The FD-IMTF 310 may also indicate other transmission parameters (e.g., transmit power level, precoding and/or transmission duration) to be used by the responding STAs 104 individually or collectively.

In the case where the FD-IMTF 310 indicates the specific resources to be used for transmission of the FD-IRFs 320, the measured potential interference obtained by the non-responding STAs 104 are resource-specific potential interference measurements. Although described in the context of MU UL transmissions, in some examples the FD-IMTF 310 format described with respect to FIG. 6 may be used to obtain resource-specific interference measurements even where MU UL multiplexing is not used. For example, the FD-IMTF 310 may indicate only one responding STA 104, or may indicate two or more STAs 104 to respond in sequence, and also indicate the specific resource to be used by each responding STA 104.

In some examples, the FD-IMTF 310 may indicate a group of intended STAs 104 to transmit respective FD-IRFs 320 on the same time-frequency resources of a channel but using different spatial resources (e.g., using their normal UL MU precodings). All other non-responding STAs 104 may obtain potential interference measurements. In another example, the FD-IMTF 310 may indicate a group of intended STAs 104 to transmit respective FD-IRFs 320 on the same time-frequency resources that are a subset of the full channel bandwidth, but using different spatial resources. This may be the case when using orthogonal frequency-division multiple access (OFDMA) as in IEEE 802.11ax, with semi-persistent allocation of frequency resources, for example. Other non-responding STAs 104 that have been allocated the same frequency resources may obtain potential interference measurements. In another example, the FD-IMTF-310 may indicate two groups of intended STAs 104 to transmit respective FD-IRFs 320 at the same time, but using different respective orthogonal frequency resources. All other non-responding STAs 104 may obtain potential interference measurements.

Figure 7:
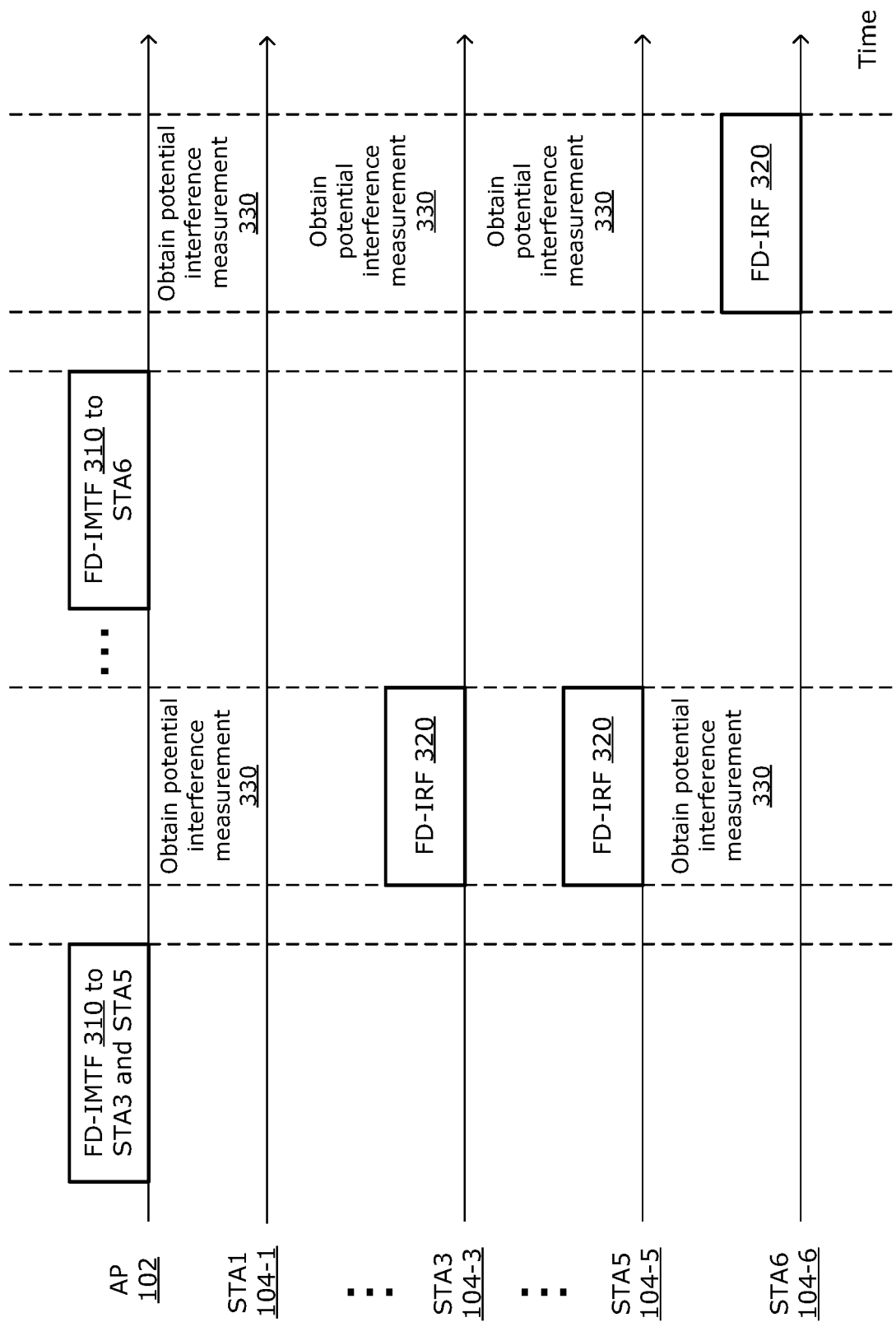
FIG. 7 is a timing diagram illustrating an example implementation of the operations of FIG. 6.

FIG. 7 is a timing diagram illustrating an example implementation of the operations shown in FIG. 6. In this example, the AP 102 transmits a multicast FD-IMTF 310 to all associated STAs 104. The FD-IMTF 310 indicates that STA3 104-3 and STA5 104-5 are the intended responding STAs 104, and also indicates respective resources to be used by each of STA3 104-3 and STA5 104-5 to respond. After STA3 104-3 and STA5 104-5 receive the FD-IMTF 310, STA3 104-3 and STA5 104-5 are each triggered to transmit, in parallel, a respective FD-IRF 320 over the respective indicated resource. The non-responding STAs 104 each obtain potential interference measurement 330 during this time. As shown in FIG. 7, the AP 102 may subsequently transmit a FD-IMTF 310 to an individual STA 104 (e.g., STA6 104-6), similar to that illustrated in FIG. 4, in order to measure potential interference from other associated STAs 104. The AP 102 may also transmit a FD-IMTF 310 to a group of STAs 104 to trigger a sequence of FD-IRFs 320, similar to that illustrated in FIG. 5.

In some examples, the AP 102 may use any of the operations described above in combination. For example, the AP 102 may initially transmit FD-IMTFs 310 intended for each STA 104 individually, (e.g., as shown in FIG. 4) in order to provide each STA 104 with appropriate parameters for transmitting the FD-IRF 320. Subsequently, the AP 102 may transmit a FD-IMTF 310 intended for the group of STAs 104 to respond in sequence (e.g., as shown in FIG. 5) or using MU UL multiplexing (e.g., as shown in FIG. 7).

Transmission of the FD-IMTF 310 by the AP 102 may be periodic, semi-periodic, event-based, intermittent, or a combination thereof (e.g., the FD-IMTF 310 may be transmitted periodically and also transmitted in response to a detected device), for example. Events that may cause the AP 102 to transmit the FD-IMTF 310 include, for example, a change in the basic service set (BSS) topology (e.g., new STA 104 joins or a STA 104 leaves, or other longer-term changes in the wireless network such as changes in distance, altitude, shadowing or connectivity), STA association, STA mobility, or user activity (e.g., a traffic session being active or inactive).

In some examples, the CCA procedure preceding the transmission of the FD-IMTF 310 may depend on the medium access category assigned by the AP 102. For instance, the AP 102 may assign the FD-IMTF 310 to a high priority category (e.g., a "priority access" category, similar to beacon frames). The AP 102 may thus perform a short CCA for the duration of a point coordination function (PCF) interframe space (PIFS) before transmitting the FD-IMTF 310, upon determining that the medium is idle. In some examples, the AP 102 may assign the FD-IMTF 310 to the same access category as management frames or other data traffic of a periodic nature (e.g., voice data). In such cases the AP 102 may perform CCA for the duration of the corresponding arbitration interframe space (AIFS) followed by a randomly generated back-off window before transmitting the FD-IMTF 310, upon determining that the medium is idle. In some examples, the transmission of a FD-IMTF 310, corresponding FD-IRF(s) 320, and possibly, corresponding FD-IMRF(s) may be contained within the time duration of a TXOP of the PCF or the hybrid coordination function (HCF) (e.g., as in IEEE 802.11e). In such cases, the time span of the potential interference measurement procedure, and possibly the reporting procedure as well, may be reserved by the AP 102 by setting the network allocation vector (NAV) of the Wi-Fi nodes in neighboring service sets to the ending time point of the procedure(s).

Regardless of the type of FD-IMTF 310 from the AP 102 or how the responding FD-IRFs 320 are triggered (e.g., as shown in FIG. 4, FIG. 5, FIG. 7, or combination thereof), at the end of the trigger sequence, each STA 104 associated with the AP 102 independently reports the potential interference measurements back to the AP 102 using a reporting frame, such as the FD-IMRF. The FD-IMTF 310 may include information to enable reporting of the FD-IMRF by each STA 104. For example, the FD-IMTF 310 may indicate the end time of the trigger sequence. The FD-IMRF may be automatically transmitted by each STA 104 following the indicated end of the trigger sequence. The FD-IMRF may also be transmitted in response to detection of an event, such as in response to a request from the AP 102.

In some examples, the CCA procedure preceding the transmission of the FD-IMRF may depend on the medium access category assigned by the AP 102. For instance, the AP 102 may assign the FD-IMRF to a high priority category (e.g., a "priority access" category, similar to a beacon frames). The STA 104 may thus perform a short CCA for the duration of a PIFS before transmitting the FD-IMRF, upon determining that the medium is idle. In some examples, the AP 102 may assign the FD-IMRF to the same access category as management frames or other data traffic of a periodic nature (e.g., voice data). In such cases the STA 104 may perform CCA for the duration of the corresponding AIFS followed by a randomly generated back-off window before transmitting the FD-IMRF, upon determining that the medium is idle.

The FD-IMTF 310 may also include information specifying how the potential interference measurements should be reported back to the AP 102. For example, the FD-IMTF 310 may indicate a tolerable interference threshold and/or a maximum number of tolerable interferers. The tolerable interference threshold indicates the received interference power level at or below which UL FD interference may be expected to not significantly interfere with DL reception. A tolerable interferer is a STA 104 that is the source of tolerable interference. Tolerable interference or a tolerable interferer may also be referred to as acceptable interference or an acceptable interferer. A STA 104 may report only the potential interference measurements that are at or below the tolerable interference threshold and/or may report only up to the maximum number of tolerable interferers. If a STA 104 has not obtained any potential interference measurements (e.g., the STA 104 does not experience any potential interference caused by transmission of FD-IRFs 320 by other STAs), the STA 104 may report that all other STAs 104 are equally tolerable interferers. If a STA 104 obtains potential interference measurements that are all intolerable (e.g., power level of all interference measurements are above the tolerable interference threshold), the STA 104 may report that all other STAs 104 are intolerable interferers, may provide a NULL report, or the STA 104 may not provide a report to the AP 102.

FIG. 8 shows an example table illustrating potential interference information that may be contained in the FD-IMRF. The example table shows potential interference measurements reported by STA1 104-1. The entries in the table are ordered from lowest potential interference measurement (i.e., lowest measured power) to highest potential interference measurement (i.e., highest measured power). The column "Sum FD-Interference" contains the cumulative potential interference measurements, starting from the lowest potential interference measurement and adding the next lowest potential interference measurement in each following row. The column "FD Interferer ID" contains the identifier of the source of the added potential interference in each row. For example, in FIG. 8, $I_5$ is the lowest potential interference measurement, and STA5 104-5 is the source; $I_6$ is the second lowest potential interference measurement, and STA6 104-6 is the source.

Different formats may be used to report the potential interference measurements. For example, the report may contain cumulative potential interference measurements only up to the tolerable interference threshold. That is, if $I_5+I_6$ is below the tolerable interference threshold and $I_5+I_6+I_2$ is above the tolerable interference threshold, then the FD-IMRF may report only the entries up to $I_5+I_6$. The report may contain only the identifiers of the interferers (e.g., omitting the column "Sum FD-Interference"). Potential interference measurements may be reported individually instead of cumulatively. Other such variations may be possible, and the format of the report may be configurable (e.g., as specified by the AP 102 in the FD-IMTF 310).

The potential interference measurement reported by each STA 104 may be the measurement obtained from the most recent round of FD-IRFs 320 (e.g., newest potential interference measurement overwrites a previous measurement), or may be a moving average of most recent and one or more previous measurements (e.g., measurements averaged over a moving window of time or over a moving window of measurement instances). Where the measured potential interference power is reported, a quantization may be applied.

The AP 102 receives the FD-IMRF from each STA 104, decodes the FD-IMRF and obtains potential interference information from the reports. The AP 102 uses the potential interference information contained in the FD-IMRFs to determine, for a given DL receiving STA 104, which (if any) other STA 104 is a tolerable interferer for a simultaneous UL transmission. The potential interference information may be stored in the AP 102 in the form of a look-up table, for example as shown in FIG. 9. The column "DL Rx STA" indicates a DL receiving STA 104. The columns "Tolerable FD-Interferers" indicate any STAs 104 that can be selected for simultaneous FD UL transmission for each DL receiving STA 104 indicated in the leftmost column. The STAs 104 indicated under "Tolerable FD-Interferers" are those STAs 104 (if any) that potentially cause FD interference at or below the tolerable interference threshold, as determined based on potential interference measurements obtained by the DL receiving STA 104. Thus, the stored potential interference information may indicate which STA (if any) would be an acceptable UL transmitting STA 104 that may be selected by the AP 102 for a simultaneous FD UL transmission during an ongoing DL transmission by a given DL receiving STA 104; the stored potential interference information may also indicate which STA (if any) would be an acceptable DL receiving STA 104 that may be selected by the AP 102 for a simultaneous FD DL transmission during an ongoing UL transmission by a given UL transmitting STA 104.

In the example shown in FIG. 9, when STA1 104-1 is the DL receiving STA, then STA5 104-5 and STA6 104-6 are both tolerable interferers, meaning that simultaneous FD UL transmissions from STA5 104-5 and/or STA6 104-6 would not cause intolerable interference at STA1 104-1. Similarly, when STA2 104-2 is the DL receiving STA, STA3 104-3 is a tolerable interferer. When STA6 104-6 is the DL receiving STA, the indicated tolerable interferers are NULL, meaning that there are no tolerable interferers, and that no simultaneous FD UL transmission is possible without causing intolerable interference at STA6 104-6. When there is more than one tolerable interferer indicated for a given DL receiving STA 104, the tolerable interferers may be stored in order from lowest potential interference measurement to highest potential interference measurement, so that the AP 102 may preferentially select the interferer causing the lowest potential interference measurement for UL transmission, or the interferer for which the transmission has more priority in terms of quality of service requirements such as maximum latency/jitter or minimum rate requirements.

For an initiated or scheduled DL transmission to a given DL receiving STA 104, the AP 102 may use the potential interference information to select one or more STAs 104 for simultaneous FD UL transmission, such that the selected STA(s) 104 are expected to cause tolerable interference at the DL receiving STA 104.

Although the example table of FIG. 9 lists tolerable interferers for a given DL receiving STA, the information contained in this look-up table may also be used by the AP 102 to select a DL receiving STA 104 for simultaneous DL transmission with an initiated or scheduled UL transmission. For example, if an UL transmission has been scheduled or initiated from STA5 104-5, the AP 102 may use reverse look-up to identify STA1 104-1 as a possible DL receiving STA 104 for a simultaneous FD DL transmission. In some examples, instead of using reverse look-up, the AP 102 may store another look-up table indicating possible DL receiving STAs for a given UL transmitting STA. In some examples, the AP 102 stores only a look-up table indicating possible DL receiving STAs for a given UL transmitting STA. The AP 102 may also store potential interference information in any suitable non-table format.

In some examples, the potential interference information may also indicate the measured potential interference power for each identified tolerable interferer. Such information may be used by the AP to control UL/DL transmission power levels. For example, based on the potential interference information, the AP 102 may indicate permitted FD UL transmission power levels, to mitigate interference with a simultaneous FD DL transmission. The AP 102 may also control its own FD DL transmit power level to mitigate the expected interference caused by a simultaneous FD UL transmission.

Figure 10:
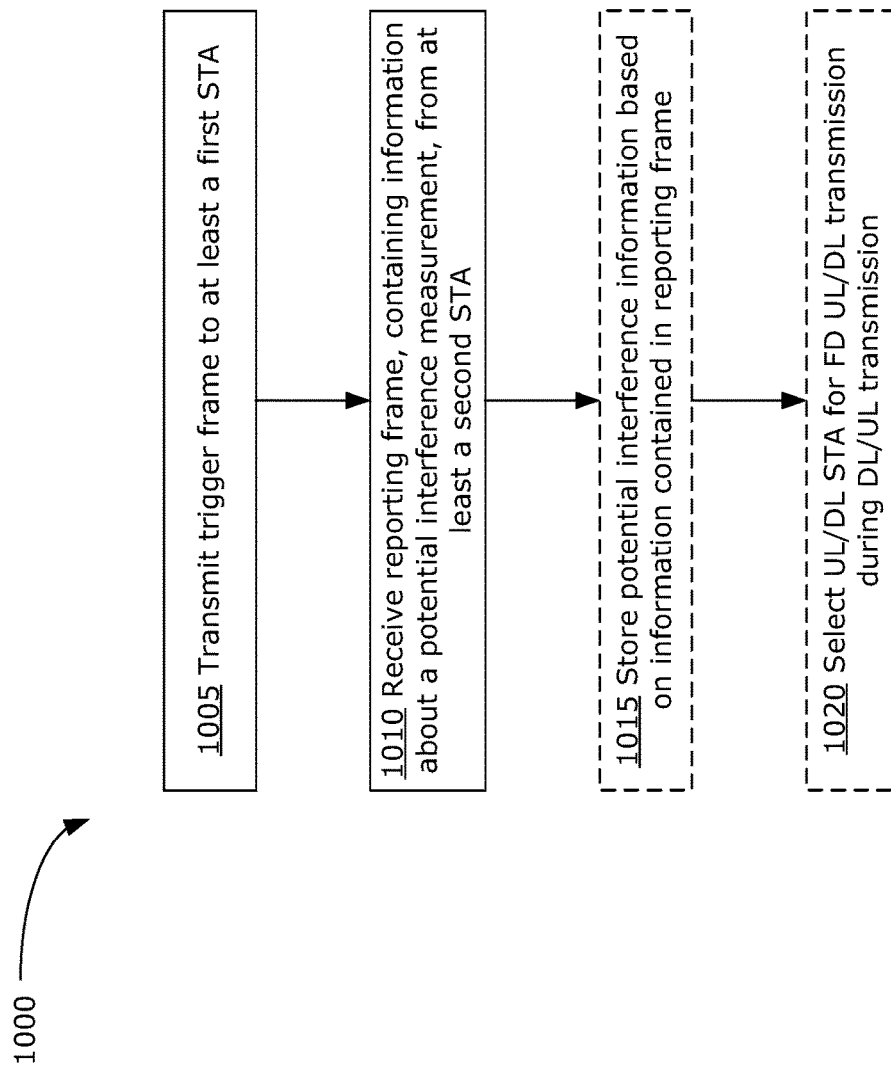
FIG. 10 is a flowchart illustrating an example method for collecting potential interference information by an AP.

FIG. 10 is a flowchart illustrating an example method 1000, which may be performed by the AP 102. The method 1000 may be performed by the AP 102 in order to collect potential interference information from one or more associated STAs 104, for example according to the operations described above with respect to FIGS. 3-7.

At 1005, the AP 102 transmits a trigger frame (e.g., the FD-IMTF 310). The trigger frame may be multicast to all associated STAs 104. The trigger frame causes at least a first intended STA 104 to initiate transmission of an UL reference frame (e.g., the FD-IRF 320) to the AP. The trigger frame also causes at least one other second STA 104 to obtain a potential interference measurement during the UL transmission by the first STA 104. As described previously, the trigger frame may include information identifying the intended STA(s) 104, transmission parameter(s) for the response transmission and/or reporting parameter(s) to be used for reporting the potential interference measurement.

In some examples, the AP 102 may determine if the FD-IRF 320 has been received from the first intended STA 104. If the FD-IRF 320 has not been received from the first intended STA 104, the AP 102 may retransmit the trigger frame before or after transmission of a trigger frame to another STA, for example as described previously. The AP 102 may further exclude any persistently unresponsive STA 104 from FD TXOP, as described previously.

At 1010, the AP 102 receives a reporting frame (e.g., the FD-IMRF) from at least the second STA 104. For example, the AP 102 may receive a respective reporting frame from each associated STA 104. The reporting frame contains information about a potential interference measurement obtained by the second STA 104, indicating any potential interference, experienced by the second STA 104, caused by the transmission of the UL reference frame from the first STA 104. The reporting frame may include information reported according to any suitable format, such as that described above with reference to FIG. 8.

Optionally, at 1015, the AP 102 may store potential interference information determined from the information collected from the reporting frames. The potential interference information may be stored according to any suitable format, such as that described above with reference to FIG. 9.

At 1020, using the information collected from the reporting frames, the AP 102 selects a UL transmitting STA for a FD UL transmission during a DL transmission (e.g., a scheduled DL transmission or an already initiated DL transmission) to another DL receiving STA; or the AP 102 selects a DL receiving STA for a FD DL transmission during a UL transmission (e.g., a scheduled UL transmission or an already initiated UL transmission) by another UL transmitting STA.

Figure 11:
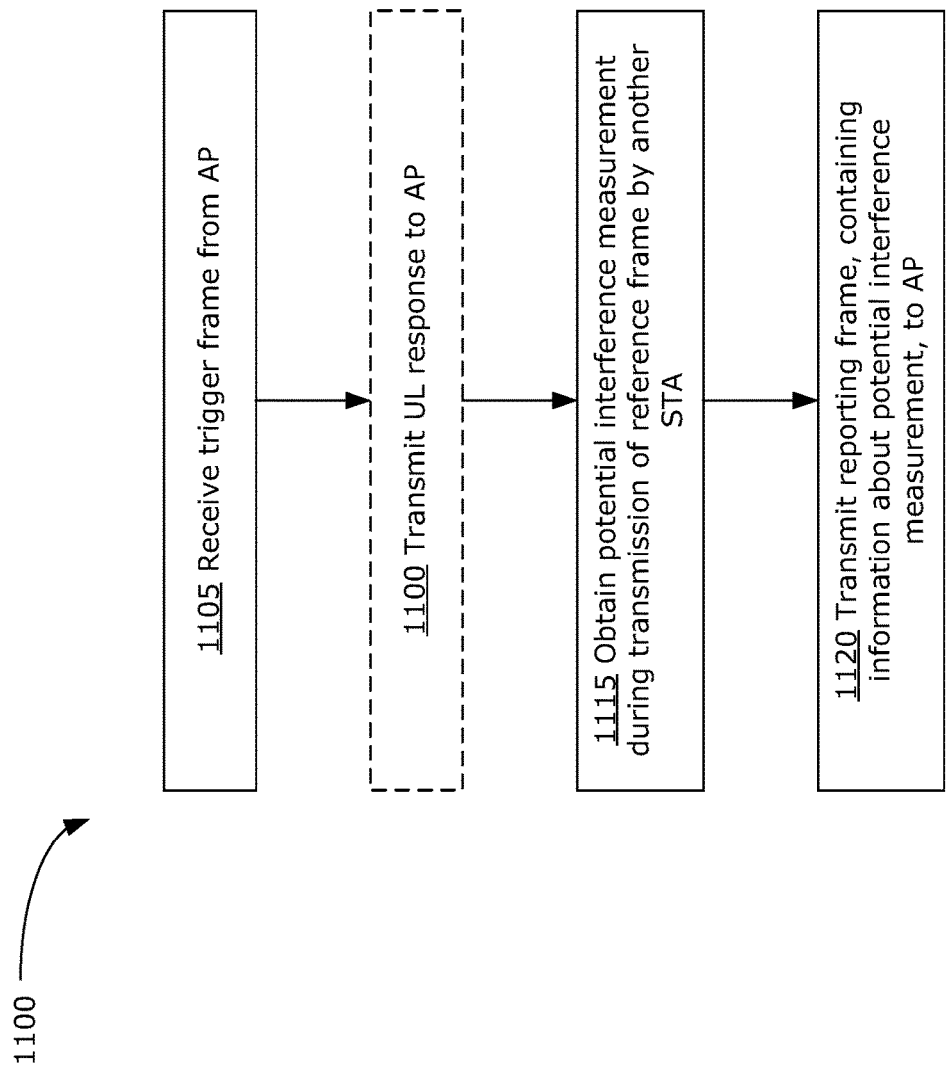
FIG. 11 is a flowchart illustrating an example method for obtaining potential interference measurements by a STA.

FIG. 11 is a flowchart illustrating an example method 1100, which may be performed by a STA 104 associated with the AP 102. The method 1100 may be performed by the STA 104 in order to obtain potential interference measurement(s), for example according to the operations described above with respect to FIGS. 3-7.

At 1105, the STA 104 receives a trigger frame (e.g., the FD-IMTF 310) from the AP 102. The trigger frame causes the STA 104 to obtain a potential interference measurement during a UL response transmission (e.g., transmission of the FD-IRF 320) by another STA 104. As described previously, the trigger frame may include information identifying the intended STA(s) 104, transmission parameter(s) for the response transmission and/or reporting parameter(s) to be used for reporting the potential interference measurement.

Optionally, if the trigger frame is intended to cause a response transmission from the STA 104, at 1110 the STA 104 may transmit an UL response transmission to the AP 102 (e.g., in accordance with any parameter(s) indicated in the trigger frame).

At 1115, the STA 104 obtains a potential interference measurement by measuring any potential interference caused by a UL response transmission by another STA 104.

At 1120, the STA 104 transmits a reporting frame (e.g., the FD-IMRF) to the AP 102, containing information about the potential interference measurement. Transmission of the reporting frame may be in accordance with any parameter(s) indicated in the trigger frame. The STA 104 may attempt to transmit the reporting frame at a time indicated by the trigger frame (e.g., indicated by an end-of-sequence flag, or by calculating the end of the response period according to a response sequence indicated in the trigger frame).

FIG. 11 is described above as illustrating a method for obtaining potential interference measurement(s) by a STA 104. However, it should be understood that FIG. 11 may also illustrate a method for an intended responding STA 104 to transmit the response transmission (e.g., the FD-IRF 320). In the case of a responding STA 104, 1110 is not optional, but 1115 and 1120 are optional.

The above examples describe a mechanism for the AP 102 to collect potential interference measurements, in order for the AP 102 to manage FD communications. In some cases, the above examples may be similarly implemented for a STA having FD capabilities (and other AP functionalities as necessary, such as in the case of a STA having some base station functionalities as in LTE-A relay), for example an FD-capable STA may engage in STA-to-STA FD communications with two other STAs, and manage the FD communications using the mechanisms described above. For example, a group owner (GO) STA in Wi-Fi Direct communications may facilitate peer-to-peer communications in the absence of an AP, and the GO STA may thus implement some functions of the AP as described above.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:

transmitting, by an access point (AP) having full duplex (FD) capabilities, a trigger frame to cause at least a first station (STA) that is an intended recipient of the trigger frame to initiate an uplink (UL) transmission including a UL reference frame to the AP immediately after a short interframe space (SIFS) from an end of the trigger frame, the trigger frame further causing at least one second STA that overhears the UL transmission established between the AP and at least the first STA to obtain a signal strength measurement during the UL transmission of the UL reference frame transmitted from at least the first STA and intended to be received by the AP; and receiving, by the AP from the at least one second STA, a reporting frame containing information about the signal strength measurement.

2. The method of claim 1, further comprising:

based on the information contained in the reporting frame, selecting a UL transmitting STA for a FD UL transmission during a DL transmission.

3. The method of claim 2, further comprising:

storing, at the AP, potential interference information determined from the information contained in the reporting frame, the potential interference information indicating: for a given DL receiving STA, any acceptable UL transmitting STA for a FD UL transmission during a DL transmission to the given DL receiving STA;

wherein selecting the UL transmitting STA is performed using the stored potential interference information.

4. The method of claim 1, further comprising:
based on the information contained in the reporting frame, selecting a DL receiving STA for a FD DL transmission during a UL transmission.

5. The method of claim 4, further comprising:
storing, at the AP, potential interference information determined from the information contained in the reporting frame, the potential interference information indicating:
for a given UL transmitting STA, any acceptable DL receiving STA for a simultaneous FD DL transmission during a UL transmission by the given UL transmitting STA; and
wherein selecting the DL receiving STA is performed using the stored potential interference information.

6. The method of claim 1, wherein the trigger frame causes a plurality of STAs to initiate transmission of respective UL reference frames to the AP, the respective UL reference frames being transmitted in sequence.

7. The method of claim 1, wherein the trigger frame indicates at least one of: an identifier of at least the first STA, a transmission parameter for transmitting the UL response transmission, or a reporting parameter for the reporting frame.

8. The method of claim 7, wherein the transmission parameter includes at least one of:
an indicator of a transmission power;
an indicator of a time-frequency pattern of reference symbols;
an indicator of a precoding to be used;
an indicator of a transmission duration; or
an indicator of a transmission resource to be used.

9. The method of claim 7, wherein the reporting parameter includes at least one of:
an indicator of a tolerable interference threshold;
an indicator of a maximum number of tolerable interferers; or
an indicator of a time for transmitting the reporting frame.

10. The method of claim 1, wherein the AP has capabilities for asynchronous FD communications.

11. The method of claim 1, wherein the AP has capabilities for synchronous FD communications.

12. The method of claim 1, further comprising:
when a UL reference frame from the first STA is not received, retransmitting, by the AP, the trigger frame to the first STA.

13. The method of claim 12, further comprising:
when a UL reference frame from the first STA is not received after a preset time period or after a preset number of retransmissions, excluding the first STA from FD transmissions for at least a defined time period.

14. A method comprising:
in response to receipt of a trigger frame from an access point (AP), obtaining, by a second station (STA), a signal strength measurement during UL transmission of a first uplink (UL) reference frame transmitted from a first STA and intended to be received by the AP immediately after a short interframe space (SIFS) from an end of the trigger frame, wherein the first STA is an intended recipient of the trigger frame, and the second STA overhears the UL transmission established between the AP and the first STA; and
transmitting, to the AP, a reporting frame containing information about the signal strength measurement.

15. The method of claim 14, wherein the information contained in the reporting frame includes at least one of:
a measured signal power; or
an identifier of a source of measured signal strength.

16. The method of claim 15, wherein the information contained in the reporting frame includes only the measured signal power or the identifier for any signal strength measurements within a defined tolerable interference threshold.

17. The method of claim 14, further comprising:
in response to receipt of the trigger frame from the AP, transmitting, by the second STA, a second UL reference frame to the AP.

18. The method of claim 17, wherein the second UL reference frame is transmitted by the second STA in sequence with the first UL reference frame by the first STA.

19. An access point (AP) having full duplex (FD) capabilities, the AP comprising:
a communications interface for wireless communications with at least a first and a second station (STA); and
a processor configured to execute instructions to cause the AP to:
transmit a trigger frame, the trigger frame causing at least the first STA that is an intended recipient of the trigger frame to initiate transmission of an uplink (UL) reference frame to the AP immediately after a short interframe space (SIFS) from an end of the trigger frame, the trigger frame further causing at least the second STA that overhears the UL transmission established between the AP and at least the first STA to obtain a signal strength measurement during the UL transmission of the UL reference frame transmitted from at least the first STA and intended to be received by the AP; and
receive, from at least the second STA, a reporting frame containing information about the signal strength measurement.

20. The AP of claim 19, wherein the processor is further configured to execute instructions to cause the AP to:
based on the information contained in the reporting frame, select a UL transmitting STA for a FD UL transmission during DL transmission.

21. The AP of claim 19, wherein the processor is further configured to execute instructions to cause the AP to:
based on the information contained in the reporting frame, select a DL receiving STA for a FD DL transmission during a UL transmission.

22. The AP of claim 19, wherein the trigger frame indicates at least one of: an identifier of at least the first STA, a transmission parameter for transmitting the UL reference frame, or a reporting parameter for the reporting frame.

23. A first station (STA) comprising:
a communications interface for wireless communications with an access point (AP); and
a processor configured to execute instructions to cause the first STA to:
in response to receipt of a trigger frame from the AP, obtain a signal strength measurement during transmission of a first uplink (UL) reference frame transmitted from a second STA and intended to be received by the AP immediately after a short interframe space (SIFS) from an end of the trigger frame, wherein the first STA overhears the transmission established between the AP and the first STA, and the second STA is an intended recipient of the trigger frame; and
transmit, to the AP, a reporting frame containing information about the signal strength measurement.

24. The first STA of claim 23, wherein the processor is further configured to execute instructions to cause the first STA to:
   in response to receipt of the trigger frame from the AP, transmit a second UL reference frame to the AP.

\* \* \* \* \*